US010847136B2

(12) United States Patent
Kneller et al.

(10) Patent No.: US 10,847,136 B2
(45) Date of Patent: Nov. 24, 2020

(54) SYSTEM AND METHOD FOR MAPPING A CUSTOMER JOURNEY TO A CATEGORY

(71) Applicant: Nice Ltd., Ra'anana (IL)

(72) Inventors: Hila Kneller, Zufim (IL); Yuval Shachaf, Netanya (IL); Gennadi Lembersky, Nesher (IL)

(73) Assignee: NICE LTD., Ra'anana (IL)

( * ) Notice: Subject to any disclaimer, the term of this patent is extended or adjusted under 35 U.S.C. 154(b) by 259 days.

(21) Appl. No.: 16/123,481

(22) Filed: Sep. 6, 2018

(65) Prior Publication Data

US 2020/0082810 A1  Mar. 12, 2020

(51) Int. Cl.
| | |
|---|---|
| *G10L 15/06* | (2013.01) |
| *H04M 3/493* | (2006.01) |
| *G06N 20/00* | (2019.01) |
| *G10L 15/18* | (2013.01) |
| *G06N 5/04* | (2006.01) |

(52) U.S. Cl.
CPC .......... *G10L 15/063* (2013.01); *G06N 5/047* (2013.01); *G06N 20/00* (2019.01); *G10L 15/18* (2013.01); *H04M 3/493* (2013.01); *G10L 2015/0638* (2013.01); *H04M 2203/555* (2013.01); *H04M 2203/556* (2013.01)

(58) Field of Classification Search
CPC .............. G10L 15/063; G10L 15/18; G10L 2015/0638; G06N 20/00; G06N 5/047; H04M 2203/555; H04M 2203/556; H04M 3/493
USPC ....................................................... 704/231
See application file for complete search history.

(56) References Cited

U.S. PATENT DOCUMENTS

| | | | | |
|---|---|---|---|---|
| 8,265,261 | B1 * | 9/2012 | Adamson | H04M 3/5166 379/265.02 |
| 9,674,362 | B2 * | 6/2017 | Piaggio | H04M 3/5141 |
| 2002/0158914 | A1 * | 10/2002 | Kuth | G06F 3/0482 715/810 |
| 2004/0128275 | A1 * | 7/2004 | Moehrle | G06F 16/168 |
| 2007/0070066 | A1 * | 3/2007 | Bakhash | G06F 3/04815 345/419 |
| 2016/0048778 | A1 * | 2/2016 | Sharon | G06Q 10/06393 705/7.11 |
| 2016/0078456 | A1 * | 3/2016 | Chakraborty | G06Q 30/0204 705/7.31 |
| 2017/0270416 | A1 * | 9/2017 | Sri | G06N 20/00 |

(Continued)

*Primary Examiner* — Edwin S Leland, III
(74) *Attorney, Agent, or Firm* — Pearl Cohen Zedek Latzer Baratz LLP

(57) ABSTRACT

Systems and methods for mapping a customer journey in an interactive voice response (IVR) system to a category from a categories list, build a directed graph based on one or more sample IVR customer journeys; generate a black list based on the directed graph; for a given customer journey: filter one or more non-informative menus from the plurality of available menus based on the black list; concatenate the respective associated menu prompt of each menu that was not filtered, and one or more user responses to one or more menu prompts from the series of interactions in the given customer journey, into a concatenated word string; calculate a similarity score between the concatenated word string and a category name of each category from the categories list; and map the given customer journey to the category whose category name produces the highest similarity score.

20 Claims, 8 Drawing Sheets

(56) References Cited

U.S. PATENT DOCUMENTS

| | | | |
|---|---|---|---|
| 2017/0293919 A1* | 10/2017 | Li | G06Q 30/0201 |
| 2018/0276723 A1* | 9/2018 | Kannan | H04L 51/34 |
| 2020/0013068 A1* | 1/2020 | Pony | G06Q 30/01 |
| 2020/0082810 A1* | 3/2020 | Kneller | G06N 20/00 |
| 2020/0082822 A1* | 3/2020 | Kneller | G10L 15/22 |
| 2020/0097271 A1* | 3/2020 | Knoulich | H04W 4/20 |

* cited by examiner

| | $v_1$ | ... | $v_j$ | ... | $v_n$ |
|---|---|---|---|---|---|
| $w_1$ | cosine | ... | ... | ... | cosine |
| ... | ... | ... | ... | ... | ... |
| $w_i$ | ... | ... | $cosine(\vec{w_i}, \vec{v_j})$ | ... | ... |
| ... | ... | ... | ... | ... | ... |
| $w_m$ | cosine | ... | ... | ... | cosine |
| MAX | max | ... | max | max | max |

FIG. 7

SYSTEM AND METHOD FOR MAPPING A CUSTOMER JOURNEY TO A CATEGORY

FIELD OF INVENTION

The present invention relates to the field of interactive voice response (IVR) reason detection. More specifically, the present invention relates to systems and methods for mapping a customer journey in an IVR system to a category from a categories list.

BACKGROUND

Contact reason is a building block in any customer journey analysis, and it refers to a customer's intent, when contacting an IVR system, as classified and/or categorized by the system, e.g., pay a bill, arrange payments, cancel account, etc. Such intentions may be categorized, for example, using a category list (e.g., a list of categories), depending on the reason for the interaction, and help provide context for a customer journey. A customer journey may be understood as the collection, sequence, or series of experiences, events, and/or interactions that a customer goes through when interacting with a company and/or the company's system (e.g., the actual experiences/events/interactions, and/or their data representation in a computing system, e.g., reflecting a series of interactions with one or more of a plurality of menus in the IVR system, as described herein). Rule-based solutions are typically used to assign contact reasons to particular interactions. IVR journey contact reason is rarely modeled as it requires a substantial amount of manual labor to define relevant rules. Yet, identifying an IVR contact reason is crucial for many use cases, such as the following:

Correlating IVR contact reason to ratings such as IVR key performance indicators (KPIs) (e.g., containment-rate, drop-rate, average time, etc.). For example, "30% of customers calling for Payment Extension process via IVR continue to agent".

IVR routing evaluation and improvements: comparing IVR contact reason to company call drivers. For example, "20% of calls transferred to agent due to technical issue with mobile were actually about upgrading a mobile device".

Repeat calls analysis: correctly identifying customers that are calling again because their issue was not resolved the first time. If the contact reason is different it is not considered a repeated call.

Customer journey analytics: producing or otherwise generating valuable insights regarding journeys that include IVR interactions (e.g., metrics relating to journey experiences of customers, patterns discovery, etc.)

Current solutions for identifying an IVR contact reason may be based on rules engines that require rules to be defined manually. However, in order to define the rules for IVR journeys, an analyst needs to review and analyze hundreds of IVR sessions and read the prompts of thousands of IVR menus in order to establish common patterns that differentiate one contact reason from another one. Then, in an iterative process, the analyst is typically required to define the rules, evaluate the categorization results on a small sample of IVR journeys that were manually categorized, and refine the rules. This process may take several weeks.

SUMMARY OF EMBODIMENTS OF THE INVENTION

An embodiment of the invention includes a method for mapping a customer journey in an interactive voice response (IVR) system to a category from a categories list. In some embodiments, the IVR system may include a plurality of available menus, each menu having an associated menu prompt, and the customer journey reflecting a series of interactions with one or more of the plurality of menus. In some embodiments, the method may be performed on a computer having a processor, a memory, and one or more code sets stored in the memory and executed by the processor. In some embodiments, the processor may build a directed graph based on one or more sample IVR customer journeys; in which the directed graph includes one or more nodes and one or more directed arcs, each node of the directed graph representing a menu of the plurality of available menus, and each directed arc representing a menu path in an IVR sequence within a given sample IVR customer journey; generate a black list based on the directed graph; for a given customer journey: filter one or more non-informative menus from the plurality of available menus based on the black list; concatenate the respective associated menu prompt of each menu that was not filtered, and one or more user responses to one or more menu prompts from the series of interactions in the given customer journey, into a concatenated word string; calculate a similarity score between the concatenated word string and a category name of each category from the categories list; and map the given customer journey to the category whose category name produces the highest similarity score.

In some embodiments, a non-informative menu may be identified for filtering based on at least one of a threshold degree of frequency of its representative node in the directed graph, a threshold in-degree of its representative node in the directed graph, and a threshold out-degree of its representative node in the directed graph. In some embodiments, the method may further include adding text of IVR menu prompts to a predefined text corpus of combined text; and training one or more word embeddings based on the combined text. In some embodiments, generating the black list includes extracting one or more menus from the set of IVR menus and adding the one or more menus to an IVR menus black list. In some embodiments, the filtering further includes filtering the one or more non-informative menus by splitting the IVR sequence into one or more IVR menus; for each menu, if the menu is in the black list, removing the menu from the IVR journey; and outputting a filtered IVR journey.

In some embodiments, the similarity score may be calculated based on a cosine similarity. In some embodiments, a similarity map may be generated for each comparison of a given IVR journey text to each category in the category list. In some embodiments, a highest similarity score may be determined based on the similarity map reflecting the highest similarity. In some embodiments, the category may be a contact reason and the list of categories is a list of contact reasons.

In accordance with further embodiments, systems may be provided which may be configured to perform embodiments of the methods described herein. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 7 is an example output of a table or tables with similarity score calculations between the input text and each contact reason according to at least one embodiment of the invention.

Figure 1:
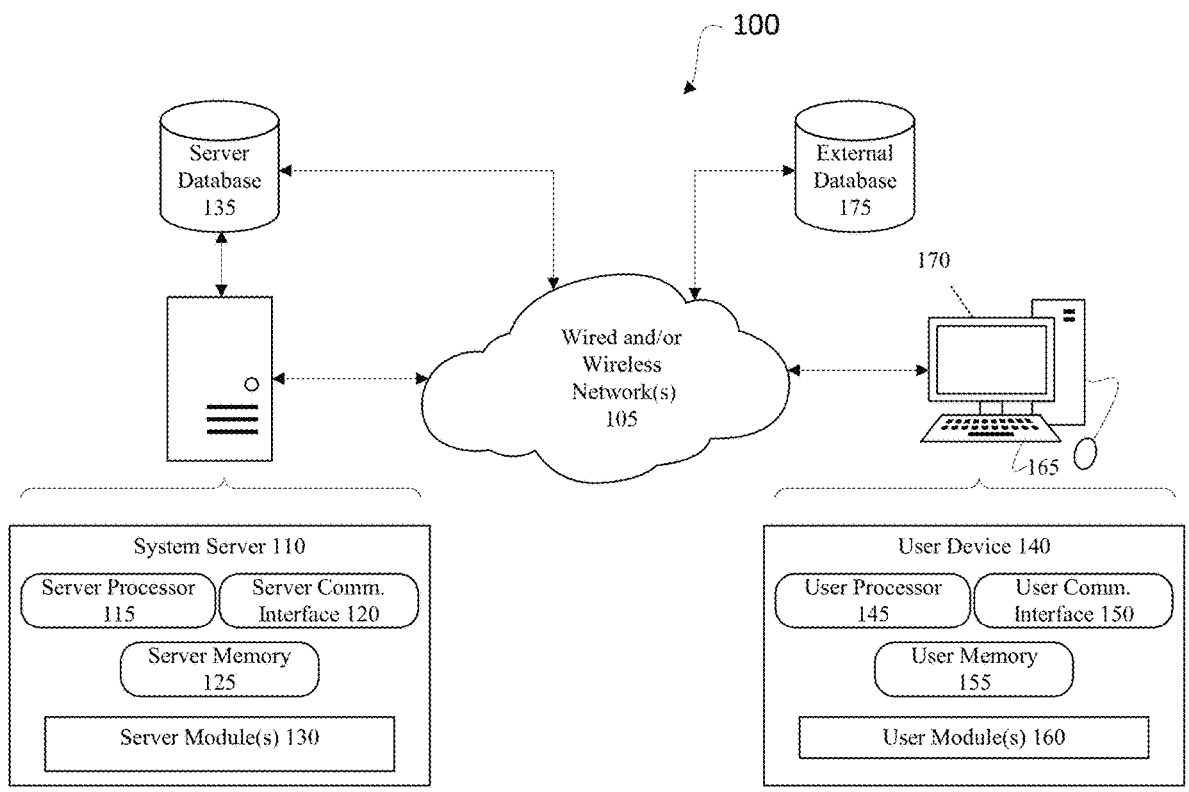
FIG. 1 is a high-level diagram illustrating an example configuration of a system for mapping a customer journey in an IVR system to a category from a categories list according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention can provide systems and methods which perform categorization of IVR journeys automatically, without any previous knowledge. Furthermore, embodiments of the systems and methods described herein are capable of categorizing millions of IVR journeys on a daily basis (which is impossible to do manually). These and other benefits are accomplished, according to embodiments of the invention, by for example providing systems and methods which map a customer journey in an IVR system to a category from a categories list or set to identify a contact reason for IVR journeys in an unsupervised manner and without any prior knowledge about the logic of the specific IVR system.

Embodiments of the invention may implement an unsupervised categorization algorithm which maps or assigns a given IVR journey to one category from a given categories list, e.g., based on the text of the prompts. Given a customer's IVR journey, embodiments of the invention may perform for example, as follows (as discussed in greater detail herein):

1. Filter out or remove non-informative menus from a list or group of menus in an IVR system. For example, a menus list may be generated with the following pre-process:
   i. Build or create a directed graph based on a sample of IVR journeys (each menu being reflected as a node or point in the directed graph, and each directed arc representing following menus in an IVR sequence).
   ii. Filter out or remove from the directed graph the most frequent menus (e.g., nodes) with the highest degree (e.g., filter out or remove non-informative menus from a list or group of menus in an IVR system by removing the nodes with the highest degree, as explained in detail herein).

2. Prompts concatenation: concatenate or combine prompts (e.g., the text played by the system) of the remaining menus (e.g., which have not been filtered out) and corresponding customer responses.

3. Calculate a text-based similarity score for each category (e.g., each contact reason):
   i. Calculate a distance-based score for every word in the concatenated prompt and every word in the category (e.g., each word being represented), for example, via a dense vector (e.g., a pre-trained, domain specific word-embedding representation). The vector space may capture semantic similarities between words in the sense that similar words will be geometrically close to each other in the vector space.
   ii. For each one of the category's words, take the maximum similarity score.

iii. The category score equals an average of those maximum scores.

4. Max score: select the category with the highest score.

Embodiments of the invention offer a completely automatic way to categorize IVR journeys. The complexity of the problem addressed by embodiments of the invention stems from the fact that an IVR system is inherently very dynamic and the text that it plays to the customer depends on the particular customer's state and history. In many cases the system may try to drive a customer towards a specific path (e.g., bill payment), while the customer may have a different intent (e.g., report faulty equipment). This results in a lengthy "dialog" that complicates the categorization process. This causes unnecessary processing power to be wasted on analyzing the additional dialog (e.g., text), as well as excess data storage to be wasted in storing the excess data in memory. Embodiments of the invention mitigate against both of these excesses by first filtering irrelevant prompts based on statistical network analysis and then computing the distance between the concatenated "dialog" via a novel alignment algorithm, as described herein.

Furthermore, embodiments of the invention may be integrated as part of a data injection pipeline and may provide a contact reason for every IVR journey handled by an IVR system. These contact reasons may further improve IVR systems by being integrated into various system analyses, such as in reports showing the distribution of contact reasons in IVR calls, IVR-to-agent routing evaluation, correlation of IVR contact reason to IVR KPIs and others.

These and other features of embodiments of the invention will be further understood with reference to FIGS. 1-8 as described herein.

FIG. 1 shows a high-level diagram illustrating an exemplary configuration of a system 100 for performing one or more aspects of the invention described herein, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is, therefore, intended to represent various forms of digital computers, such as laptops, desktops, workstations, personal digital assistants, servers, blade servers, mainframes, and other appropriate computers and/or networked or cloud-based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or several processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such as a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In accordance with embodiments of FIG. 1, the exemplary software modules may include a communication module and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are, therefore, intended to be representative of the various functionalities of system server 110 in accordance with some embodiments of the invention. It should be noted that, in accordance with various embodiments of the invention, server modules 130 may be executed entirely on system server 110 as a stand-alone software package, partly on system server 110 and partly on user device 140, or entirely on user device 140.

Server memory 125 may be, for example, random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110.

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
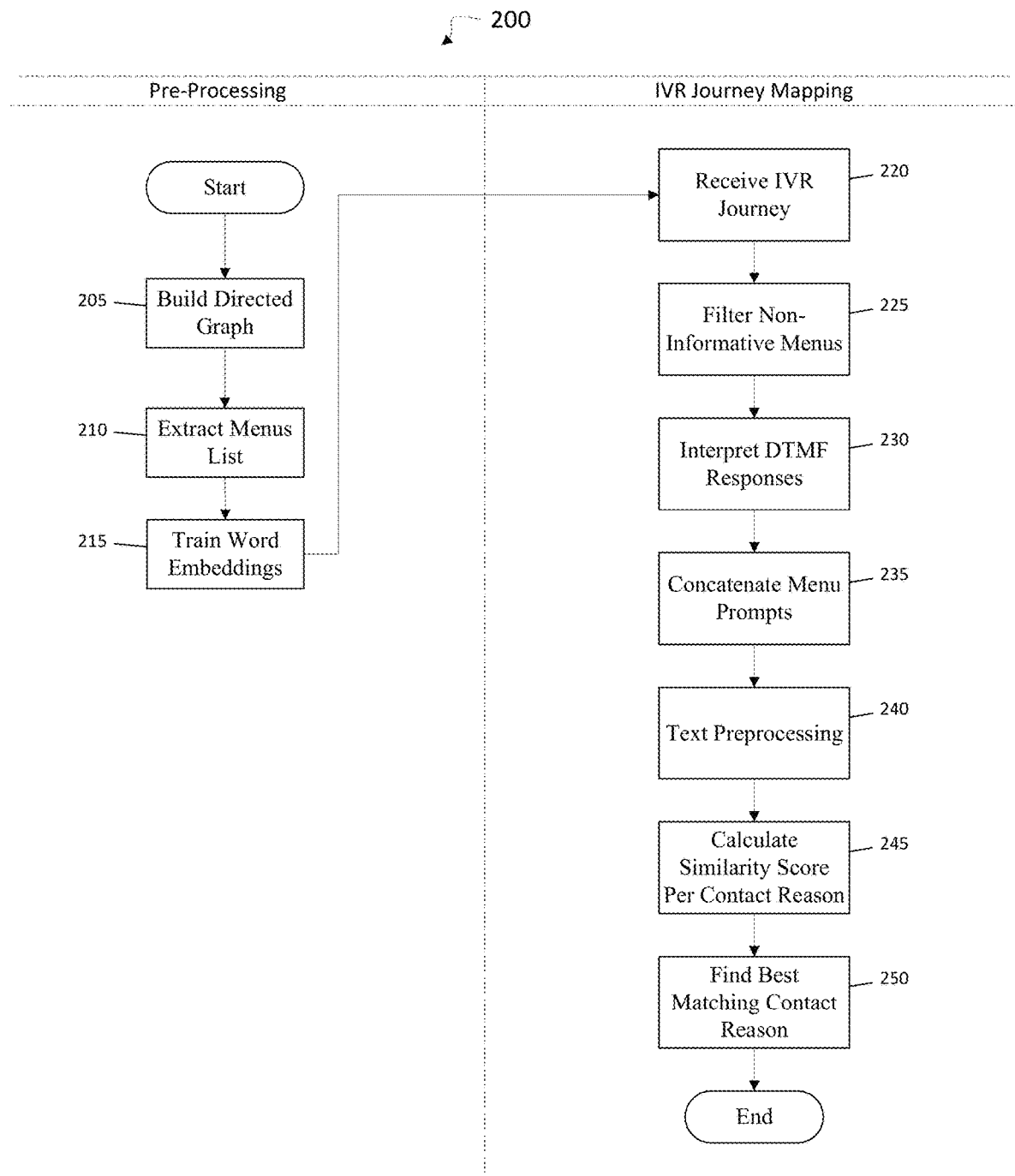
FIG. 2 is a high-level diagram illustrating an example configuration of a method workflow for mapping a customer journey in an IVR system to a category from a categories list according to at least one embodiment of the invention.

FIG. 2 is a high-level diagram illustrating an example configuration of a method workflow 200 for mapping a customer journey in an IVR system to a category from a categories list according to at least one embodiment of the invention. As described herein, embodiments of systems and methods of the invention include at least two main phases: a pre-processing phase and an IVR journey categorization phase. Furthermore, as described in detail herein, in some embodiments the pre-processing phase may consist of two distinct pre-processes or stages, each of which may be performed consecutively (e.g., in any order) or concurrently: building, generating, or otherwise creating a menu "black list" for menu filtering, and training word embeddings.

In some embodiments, method workflow 200 may be performed on a computer (e.g., system server 110) having a processor (e.g., server processor 115), memory (e.g., server memory 125), and one or more code sets or software (e.g., server module(s) 130) stored in the memory and executing in or executed by the processor. Method workflow 200 begins with the first of the two pre-processes, building a menu black list (e.g., a list of IVR menus to be filtered), at step 205, when the processor is configured to build a directed graph, as described in detail with reference to FIG. 3.

Figure 3:
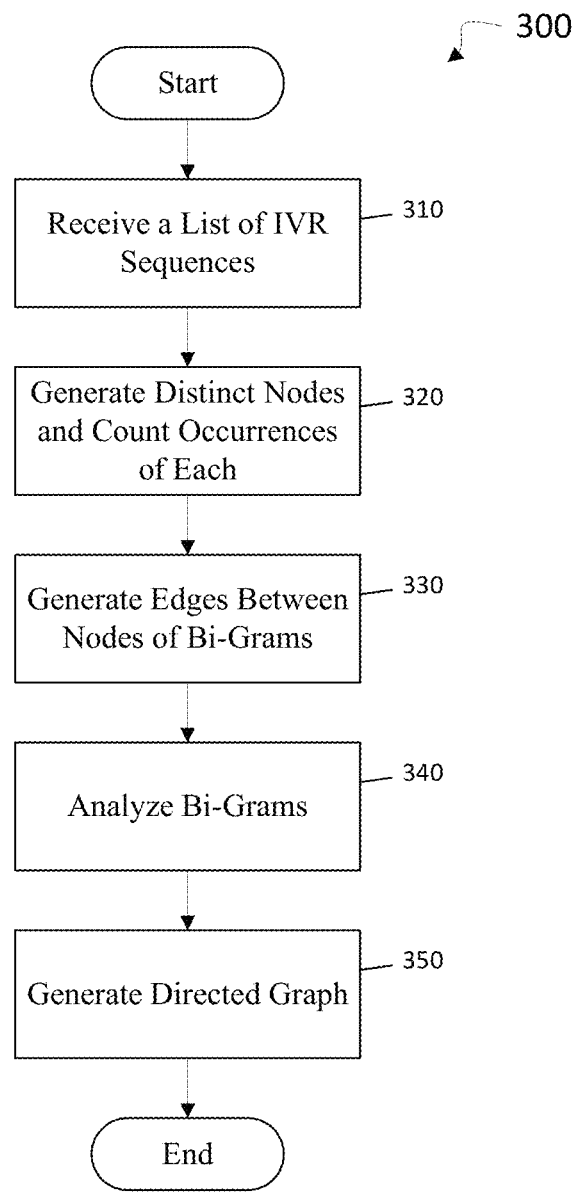
FIG. 3 is a high-level diagram illustrating an example configuration of a method workflow for generating a directed graph according to at least one embodiment of the invention.

Turning briefly to FIG. 3, a method 300 of generating a directed graph is described according to at least one embodiment of the invention. At step 310, to build or create a directed graph, in some embodiments, a processor may receive as an input a list of IVR sequences. An IVR journey, as understood herein, may be defined by a given path through an IVR system represented by a list of IVR menu identifiers ("menu IDs"). An IVR sequence, as understood herein, may be a portion or the entirety of a given IVR journey, and includes a sequence of IVR menu identifiers representing a sequence of menus in the IVR journey. An example list of IVR sequences is shown in Example 1 below:

Example 1

[7865,7756,7333,6777,2343],
[6777,4567,7345,3453,6633,9384],
[7686,5568,3454,2343,2982]

In some embodiments, at step 320, for each listed IVR journey, the processor may generate a distinct node in the direct graph for each IVR menu, and calculate or otherwise provide a count of the number of occurrences of each node (e.g., reflecting the number of times a given IVR menu is represented). In some embodiments, at step 330, the processor may be configured to generate an arc, edge, or link between the nodes of each bi-gram of IVR menus (e.g., pairs of consecutive IVR menus in an IVR sequence). As understood herein, an arc, edge, or link represents a functional connection between pairs of nodes. In some embodiments, one or more of such connections may be directional or bi-directional in nature, e.g., a directed arc or edge), and each directed arc may represent a menu path in an IVR sequence within a given sample IVR customer journey. In some embodiments, at step 340, the processor may be configured to analyze, for example, all the bi-grams of the IVR menus (e.g., pairs of consecutive IVR menus) within each IVR sequence. For example, the processor may calculate the degree-in (e.g., instances in which the node is a second in a pair), the degree-out (e.g., instances in which the node is the first one in a pair), the degree (e.g., the number of connections a given node has to other nodes, or degree-in +degree-out) of each node, and/or the number of occurrences of each pair.

At step 350, in some embodiments the processor may generate (e.g., output or construct) a directed graph based on the nodes, edges (e.g., directed arcs), and degrees. In some embodiments, a directed graph representing an IVR system may include nodes representing IVR menus, an edge or link from a node representing a given menu A to a node representing a given menu B indicating that there is an IVR sequence in which the menu B directly follows the menu A, and the weight of the edge indicating the number of times the menu B directly follows the menu A in a given sample (e.g., a given sample IVR journey or sample set of IVR journeys).

Figure 4:
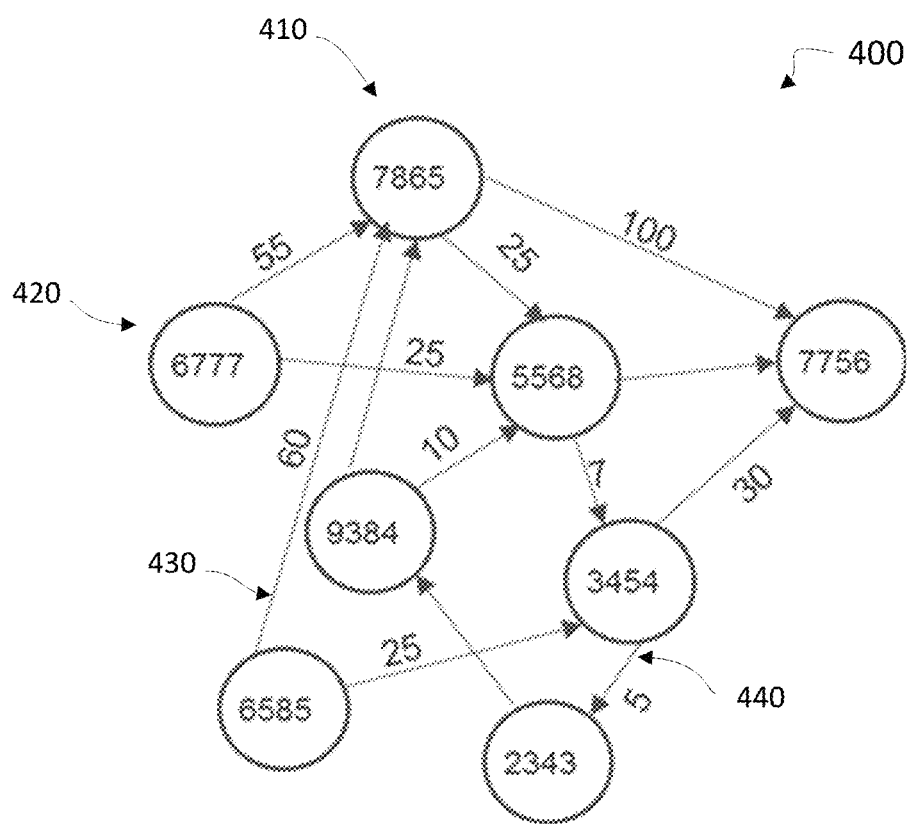
FIG. 4 is an example directed graph according to at least one embodiment of the invention.

For example, using the inputs in Example 1 above would yield as an output a directed graph 400 as provided in FIG. 4, which includes nodes (e.g., nodes 410, 420) and edges (e.g., directed arcs 430, 440). In this example, the degree-in of the node labeled "7865" in directed graph 400 of FIG. 4 is 55+25+60=140, the degree-out is 100+25=125 and the degree equals to degree-in +degree-out=140+125=265 (accounting for all the edges associated with node 7865).

Returning to FIG. 2, at step 210, the processor may be configured to extract one or more menus from the set of IVR menus and add the one or more menus to an IVR menus black list, (e.g., a list of IVR menus to be filtered), as described in detail with reference to FIG. 5.

Figure 5:
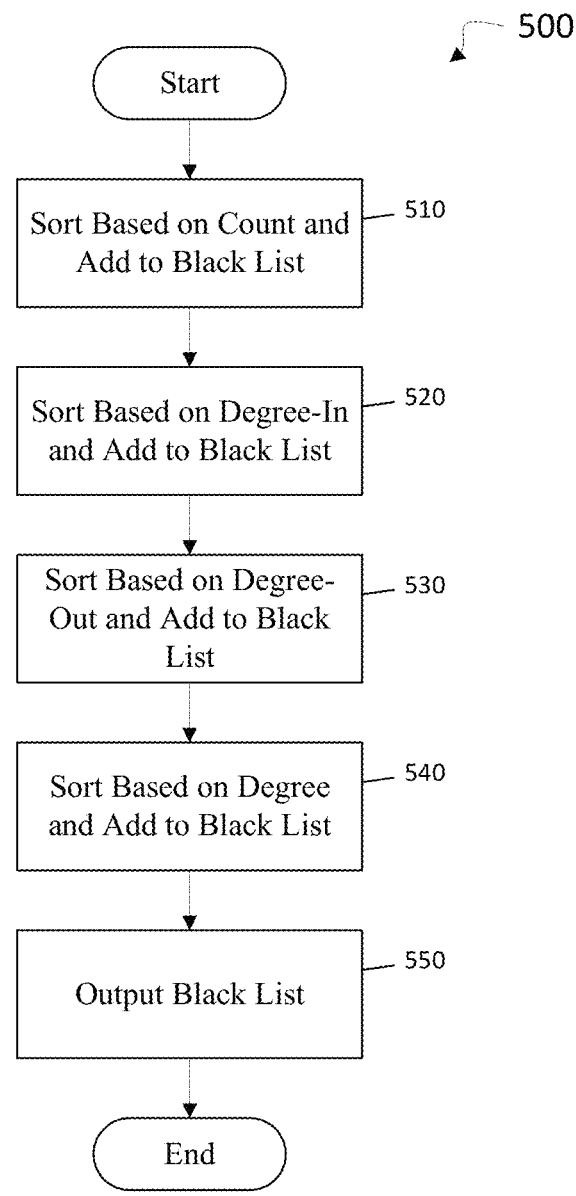
FIG. 5 is a high-level diagram illustrating an example configuration of a method workflow for generating an IVR menus black list based on the directed graph according to at least one embodiment of the invention.

Turning briefly to FIG. 5, a method 500 of generating an IVR menus black list based on the directed graph is described according to at least one embodiment of the invention. At step 510, the processor may sort the nodes of the directed graph, e.g., in descending order, based on the node count (e.g., as described in step 320) and add the top N percent to a set of IVR menus to be included in the IVR menus black list (in which N is a previously defined threshold percentage). At step 520, the processor may sort the nodes, e.g., in descending order, based on degree-in (e.g., as described in step 340), and add the top N percent to the set of IVR menus to be included in the IVR menus black list. At step 530, the processor may sort the nodes, e.g., in descending order, based on degree-out (e.g., as described in step 340) and add the top N percent to the set of IVR menus to be included in the IVR menus black list. At step 540, the processor may sort the nodes, e.g., in descending order, based on the degree (e.g., as described in step 340) and add the top N percent to the set of IVR menus to be included in the IVR menus black list. In step 550, the processor may generate (e.g., output to a display or memory) the IVR menus black list based on the various sortings. Of course, it should be noted that in various embodiments, more or less sortings may be included, and/or various thresholds may be applied to different sortings.

Returning again to FIG. 2, method workflow 200 continues with the second of the two pre-processes, training word embeddings, at step 215. In some embodiments, the processor may add the text of the IVR menu prompts (e.g., domain specific text from the IVR system) to a text corpus of combined text (e.g., a previously defined or generated large and structured set of texts), and train one or more word embeddings based on the combined text, for example, using existing tools such as: word2vec, GloVe, fastText, GenSim and others. Word embedding, as understood herein, is the collective name for a set of language modeling and feature learning techniques in natural language processing (NLP) in which words or phrases from a given vocabulary are mapped to vectors of real numbers. Conceptually this involves a mathematical embedding from a space with one dimension per word to a continuous vector space with a much lower dimension. In some embodiments, one or more of these NLP techniques may be implemented in order to create the word embeddings, which may be implemented in later steps of method 200, as described herein.

After the pre-processing phase, in some embodiments the method may continue with the IVR journey categorization phase, as described herein. At step 220, in some embodiments, the processor may receive, as an input, an IVR journey. In some embodiments, an IVR Journey (e.g., an IVR sequence) may be represented as a list of menus. Furthermore, a menu may be represented as a tuple that includes 3 strings: a menu ID, a prompt, and response. An example IVR menu prompt and response are shown in Example 2 below.

Example 2

Prompt: For 'Billing' say 'billing' or press 1, For 'Connections' say 'connections' or press 2, For 'Faults' say 'faults' or press 3, or for 'Products' say 'products' or press 4."
Response: 'billing'

In some embodiments, an IVR menu may include voice recognition, dual-tone multi-frequency (DTMF) signaling, or both options. In some embodiments, e.g., when a user verbalizes a response to a prompt by the IVR system, the response may be analyzed by an IVR automatic speech recognition (ASR) system and recorded. In some embodiments, e.g., when a user presses a button corresponding to the desired option (e.g., pressing 2 for 'Connections'), the response may be interpreted in the context of the prompt options and recorded. In the above example, if a user presses 1, the press may be interpreted as 'billing'.

At step 225, the processor may filter or remove one or more non-informative menus from the plurality of available menus (e.g., the menus that make up the IVR journey). In some embodiments, the processor may filter one or more non-informative menus from the plurality of available menus e.g., based on the black list. As understood herein, a non-informative menu is a menu within an IVR journey having a defined lack of informative value in determining the correct category for the IVR journey. In some embodiments, a non-informative menu may be a menu within an IVR journey that also appears on the black list, e.g., due to its lack of informative value in determining the correct category for the IVR journey. In some embodiments, a non-informative menu may be identified for filtering, for example, based on at least one of a threshold degree of frequency of its representative node in the directed graph, a threshold in-degree of its representative node in the directed graph, and/or a threshold out-degree of its representative node in the directed graph, as explained in detail herein. In some embodiments, the processor may filter or remove the one or more non-informative menus by splitting or dividing the IVR journeys or sequences into IVR menus, and, for each menu, if its corresponding menu ID is in the black list, then the processor may remove it from the IVR journey. The output of this is a filtered IVR journey.

At step 230, in some embodiments the processor may interpret any DTMF responses in the filtered IVR journey (e.g., when a user presses 1, 2 or any other number option rather than articulating the response verbally) and replace the selected option with its meaning extracted from the prompt. In some embodiments, for each menu, the processor may first parse the prompt to produce a table of options, e.g. {1: 'billing', 2: 'connections', 3: 'faults', 4: 'products'}.

This may be implemented, for example, by the processor identifying recurrent patterns in the prompt, e.g., "PRESS NUM FOR X" or "NUM FOR X", and then constructing a table from the patterns in which NUM=X. In some embodiments, if a user response is a key in a table of options, the processor may replace it with the corresponding value.

At step 235, the processor may concatenate or combine the respective associated menu prompt of each menu that was not filtered, and one or more user responses (e.g., responses to the menu prompt) to one or more menu prompts from the series of interactions in the given customer IVR journey, into a concatenated word string. As understood herein, concatenation refers to the operation of joining character strings end-to-end. In some embodiments, the processor may concatenate the filtered IVR string by, for example, initializing an empty result string, splitting the filtered IVR journey to individual steps, and, for each step, appending prompt and response values to the result string. In some embodiments, the resulting output may be a text string that is a consecutive concatenation of prompts and responses in the given IVR journey.

At step 240, in some embodiments, the processor may perform text preprocessing on the text comprising concatenated prompts and user responses. For example, in some embodiments all or specific uppercase letters may be converted to lowercase, function words may be removed, and/or stemming may be performed. Stemming, as understood herein, may refer to the process of reducing inflected (and/or sometimes derived) words to their word stem, base, or root form. Such preprocessing functions may be performed by implementation of existing NLP tools as known in the art, such as, e.g., spacy, openNLP, or Stanford NLP. An example output may be "purchase new WiFi modem need help connect PC tablet press 2".

At step 245, the processor may calculate a similarity score between the concatenated word string (e.g., the filtered and pre-processed IVR journey text) and a category name of each category from a categories list, as described in detail with reference to FIG. 6. In some embodiments, the categories list may be, for example, a list or set of contact reasons, e.g., reasons why the caller contacted the IVR system. A contact reason may be a short phrase, for example, "ADSL fault" (indicating a fault in an asymmetric digital subscriber line), "Payment extension", and others.

Figure 6:
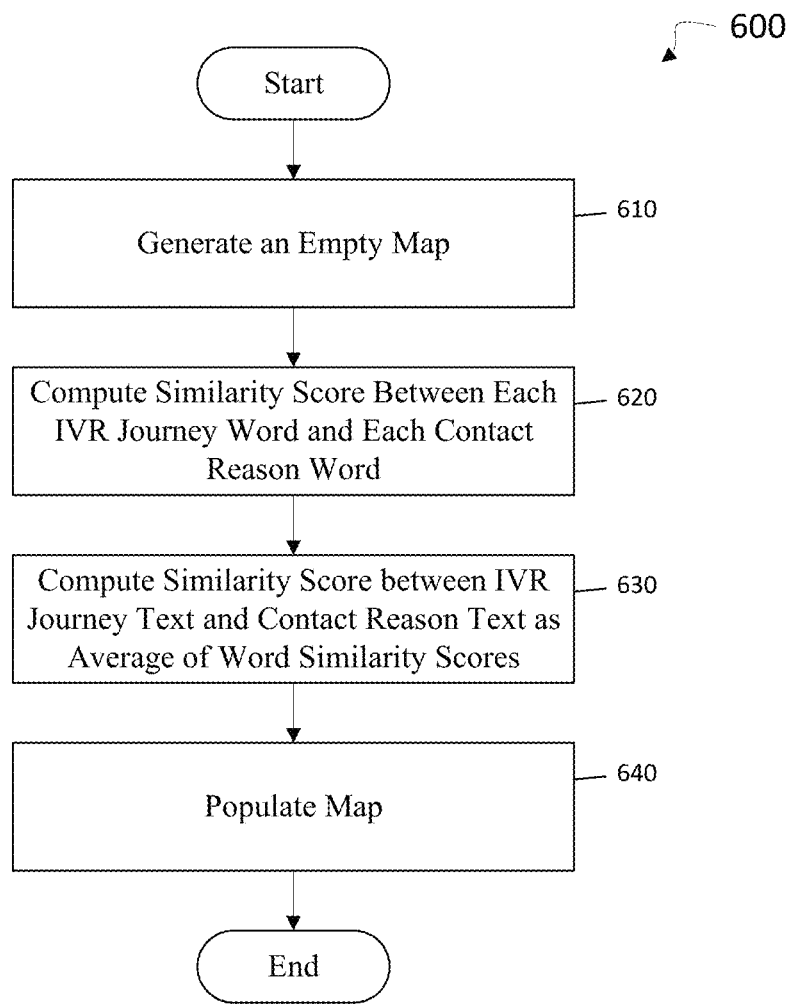
FIG. 6 is a high-level diagram illustrating an example configuration of a method workflow for calculating a similarity score according to at least one embodiment of the invention.

Turning briefly to FIG. 6, a method 600 of calculating a similarity score is described according to at least one embodiment of the invention. At step 610, in some embodiments the processor may generate or otherwise instantiate an empty map. As understood herein, a map is a particular data structure or table in which data is stored in the form of key and value pairs, every key is unique, and each key maps to, links with, or is otherwise associated with, a value. Of course, one of ordinary skill will understand that there are many different types of map data structures which may be implemented differently using different programming languages. An empty map, as understood herein, is a map that includes no data, meaning its data fields are empty.

At step 620, in some embodiments, using word embeddings, e.g., the trained word embeddings of step 215, for each contact reason from the list of contact reasons, the processor may compute a first similarity score ('S'), between each word ($w_j$) in the IVR journey text and each word ($v_i$) in the contact reason. It should be noted that in various embodiments, one or more similarity measures may be implemented in calculating the various similarity scores described herein. For example, in some embodiments, a cosine similarity may be used, using, for example, the following equation:

$$S(v_i, w_j) = \text{cosine}(\text{embedding}(w_i), \text{embedding}(v_j))$$

Cosine similarity, as understood herein, is a measure of similarity between two non-zero vectors of an inner product space that measures the cosine of the angle between the two vectors. In text analysis, each term may be notionally assigned a different dimension and a text may be characterized by a vector where the value in each dimension corresponds to the number of times the term appears in the text. Cosine similarity then gives a useful measure of how similar two sets of text are likely to be in terms of their subject matter. Of course, in some embodiments other known similarity measures may also or alternatively be implemented.

At step 620, in some embodiments the processor may compute, for each word $v_i$ in the contact reason text (V), a similarity score representing its similarity to the IVR journey text (W), as the maximum similarity to words in the text W, e.g., using the following equation:

$$S(v_i, W) = \max(S(v_i, w_j)) \text{ where } w_j \text{ is a word in } W$$

Next at step 630, in some embodiments, the processor may calculate a similarity between the IVR journey text (W) and the contact reason text (V) as the average of similarity scores between each word of the contact reason and the IVR Journey text as computed in the second similarity score, e.g., using the following equation:

$$S(V, W) = \text{average}(S(v_i, W)) \text{ for all } v_i \text{ in } V$$

At step 640, in some embodiments the result of the similarity score S(V,W) (e.g., of step 630 above) may be inserted into the empty map, e.g., the processor may populate the map, generating a similarity map, based on the similarity score S(V,W). In some embodiments, method 600 may be executed by the processor for each contact reason (e.g., each category) in the list of contact reasons (e.g., in the list of categories), thereby generating maps reflecting the comparison of a given IVR journey text to each of the contact reasons in the contact reason list.

By way of example, Table 1 below shows an example output map resulting from the execution of a comparison between one contact reason ("payment extension") and one prompt fragment ("extend payment press 1").

TABLE 1

|         | payment | extension |               |
|---------|---------|-----------|---------------|
| extend  | 0.4     | 0.8       |               |
| payment | 1.0     | 0.5       |               |
| press   | 0.2     | 0.11      |               |
| 1       | 0.01    | 0.02      |               |
| MAX     | 1.0     | 0.8       | Average (0.9) |

Returning to FIG. 2, at step 250, in some embodiments, the processor may map a given customer journey to the category whose category name produces the highest similarity score, e.g., the contact reason which best matches the IVR journey text based on the similarity scores. In some embodiments, for a given IVR journey, the processor may take as an input the tables or maps with populated similarity scores (e.g., as described with reference to method 600), and sort the maps, e.g., in descending order, based on the similarity score of each, and return the top N contact reason(s). In some embodiments, depending on the number of top contact reasons returned, e.g., based on a predefined threshold and/or based on whether there is a statistically clear best match (e.g., one highest score with no ties), the IVR customer journey may be mapped to or otherwise associated with a best matching contact reason or reasons. In some embodiments, a data output of this may be, for example, a link in a database between a data representation of the journey and a data representation of the contact reason, and/or an output to a display.

An example algorithm according to an embodiment of method 600 is summarized below:

In order to choose the correct contact reason for IVR journey J, the algorithm may:

calculate a similarity score between the IVR journey words to each of the contact reason words:

$$S_i = \frac{\sum_{v \in CR_i} \max_{w \in J}(\cosine(\vec{v}, \vec{w}))}{n}$$

and choose the contact reason with the highest score:

$$CR(J) = \operatorname{argmax}_{1 \le i \le k} S_i$$

Notations:

$CR_i$=The i contact reason (e.g., Billing, Technical Support)
k=number of different contact reasons
J=the IVR journey represented as concatenated prompts words
v=word in the contact reason
w=word in the concatenated prompts of the journey
$\vec{v}, \vec{w}$=the words embedded vectors The output is a table or tables with similarity score calculations between the input text and each contact reason, an example of which is shown in FIG. 7.

Embodiments of the invention provide significant improvements to IVR system technology in general and to IVR journey contact reason matching in particular, materially mitigating against unnecessary processing power being wasted on analyzing additional dialog (e.g., text), as well as excess data storage being wasted in storing excess data in memory. By way of example of the efficacy and improvement of implementing the systems and methods described herein, embodiments of the invention were tested on 200 manually labeled real IVR journeys achieving ~88% accuracy (with no previous algorithms executed). The following table, Table 2, includes a few example results.

TABLE 2

| Contact Reason | Prompts | Sequence |
| --- | --- | --- |
| Technical support | Thanks for calling demoivr3.\Now, please just say or enter a phone number that's linked to your internet account\Was that . . . \Please say 'yes' or 'no'.\Thanks. Just a second . . . \Is this call today about technical support?\Have you restarted your modem and computer or device to see if that will fix the issue your currently experiencing?\Please look at the text message we just sent to your mobile, and tap the link to start trouble shooting your ADSL connection, Wi-Fi or email setup problem. Please hang up now and tap the link to be guided through the trouble shooting steps. If you're not \We are currently experiencing long wait times. Would you like us to call you back in approximately . . . \Sorry, I appear to be having difficulty registering your call back. I'll just put you back in the queue for now.\When you've finished, please stay on the line to provide some feedback about your experience. | 79940, 78367, 78377, 78379, 78380, 79017, 79124, 79750, 80469, 80469, 80469, 80468, 80467, 79973, 80241, 80242, 79966 |
| Billing and payment | Thanks for calling demoivr Business.\ . . . and is your enquiry about the phone you're on right now? Please say 'yes' or 'no'.\So please just say or enter the phone number\Thanks. Just a second . . . \Was that . . . \Please say 'yes' or 'no'.\So I can direct your call to the right place, in just a few words please tell me the reason for your call.\Okay, one second . . . \There are lots of ways to pay your demoivr account. You can set up a direct debit. Another popular way is online at our secure website. Go to demoivr dot com forward slash bill pay. You can bpay from your own bank if you have a biller code and reference n\Okay, to find out the balance of your billed and unbilled call charges, say 'Account Balance'. If you'd like to get a copy of your bill say 'Bill Copy'. Or for anything else about your account say 'Other Enquiry'\When you've finished, please stay on the line to provide some feedback about your experience. | 79948, 78349, 78362, 78380, 78377, 78379, 78707, 78698, 79637, 79627, 79973, 79966 |
| Technical support | . . . and is your enquiry about the phone you're on right now? Please say 'yes' or | 78349, 78380, 78707, 78717, 79369, 79011, 79530, |

TABLE 2-continued

| Contact Reason | Prompts | Sequence |
| --- | --- | --- |
| | 'no'.\Thanks. Just a second . . . \So I can direct your call to the right place, in just a few words please tell me the reason for your call.\As demoivr offers lots of different services to Mobile callers I need you to tell me a little more about the reason for your call today. You can say something like 'check my account balance' or 'find out about Messagebank'. So, what's the reason?\That's to report a fault with a mobile . . . \ . . . is that right?\Okay, one second . . . \If your phone is asking for a PUK code, please say 'P.U.K'. If you need to reset your PIN, please say, 'pin reset'. You can also try turning your phone off and on again. This resets the phone on the network and may fix the issue. If you're currently calli\When you've finished, please stay on the line to provide some feedback about your experience.\Not tech savvy? Check out demoivr dot com forward slash mobile support for troubleshooting tips for some of the popular handsets./Need a little help to get the most out of your mobile? At demoivr dot com forward slash mobile support you will find step by step tips on everything from mobile support to setting up and customising some of the popular handsets | 79054, 79973, 80451, 80452, 80454, 80456, 80457, 80458, 80459, 80460, 79966 |

Figure 8:
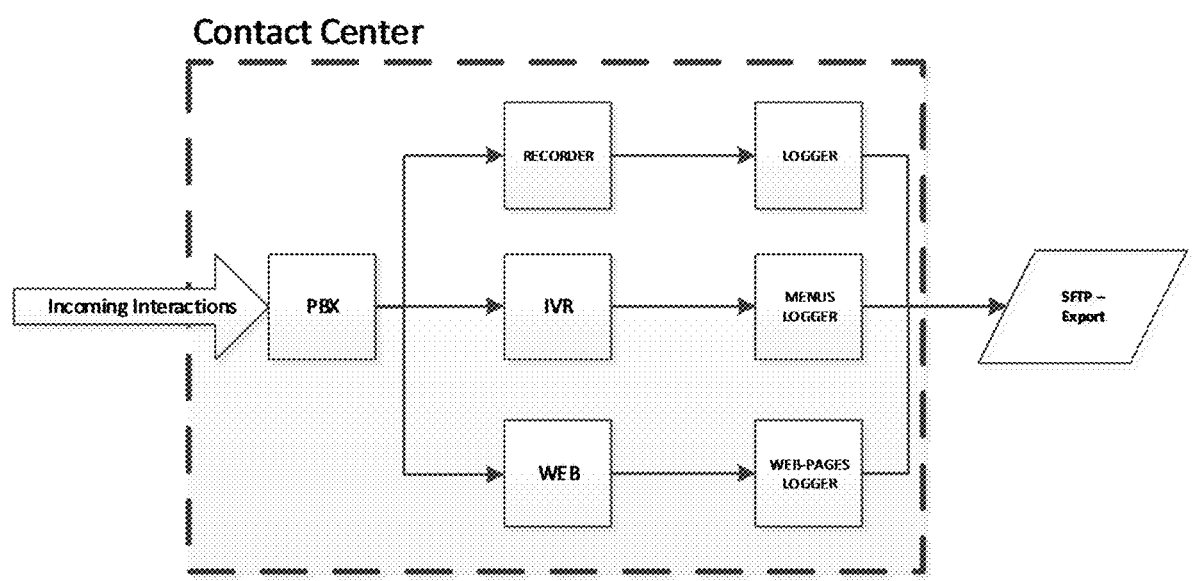
FIG. 8 is a high-level diagram illustrating an example configuration of a contact center infrastructure in which embodiments of the invention may be integrated.

FIG. 8 is a high-level diagram illustrating an example configuration of a contact center infrastructure in which embodiments of the invention may be integrated. In some embodiments, logs of the IVR systems may be stored, for example, as comma-separated values (CSV) files on a Secure File Transfer Protocol (SFTP) server, e.g., system server 110 of FIG. 1. In some embodiments, there may be at least two files named, e.g., IVREvents and IVRSessions. Each row in the IVRSessions file may represent a single IVR transaction and includes fields such as ID, customer_ID, startTime, endTime, duration and others. The IVREvents file may provide more details and may represent each session as a list of IVR menu visits. Each row in the IVREvents file may represent a single IVRMenu visit and contains fields, such as ID, SESSION_ID, CUSTOMER_ID, MENUID, PROMPT, RESPONSE, and others.

In some embodiments, from the SFTP server the files may be integrated in a batch processing pipeline. For example, a pipeline that originally used a rule-based system to categorize each session according to the contact reason may instead be programmed to implement the IVR journey contact reason detector to provide an automatic categorization for IVR sessions. After preprocessing, the data may be stored in a data storage system, e.g., server database 135 or external database 175, in two tables, e.g., IVREVENTS and IVRSESSIONS, using the same or equivalent structure as the raw CSV files. In some embodiments, the field contact_reason (e.g., reflecting the mapped contact reason for each IVR journey) may be added to the IVRSESSIONS table during the pre-processing phase. This data may be used then by various other system applications.

By way of a first example, some embodiments of the invention may correlate IVR contact reasons to IVR KPIs (for example, containment-rate, drop-rate, average time etc.) and sort different contact reasons with respect to given KPIs, e.g., in order to provide insights such as: "30% of customers calling for Payment Extension process via IVR, continues to agent". As such, in some embodiments, the processor may, for each contact reason: (1) extract from the database all IVR sequences that have been assigned with the given contact reason, (2) compute an average containment-rate (or any other given KPI) over the extracted sequences, (3) sort the contact reasons based on average containment rate in the descending order, and (4) present the results, e.g., on a display, to an analyst.

By way of a second example, some embodiments of the invention may compare IVR contact reasons to company call drivers (e.g., the topics which drive customers to call and typically account for the highest volume of traffic to an IVR), e.g., in order to produce insights such as "20% of transferred to agent calls due to Technical issue with mobile, were actually about upgrading a mobile". As such, in some embodiments, the processor may, for each IVR sequence that reached an agent (e.g., due to the caller's issue not being properly resolved via the IVR): (1) if IVR contact reason does not match a company call driver, (2) store a pair (e.g., IVR_CR, NX_CALL_DRIVER) with count=1 (or if the pair already exists increase the count by 1), (3) sort (e.g., IVR_CR, NX_CALL_DRIVER) based on the count, e.g., in the descending order, and (4) present the results, e.g., on a display, to an analyst.

Of course, in other example implementations, systems and methods according to embodiments of the invention may, for example, process a repeat calls analysis: correctly identify customers that are calling again because their issue was not resolved at the first time. If the contact reason is different then the call would not be a repeated call. Another example implementation is in Customer journey analytics: e.g., providing valuable insights regarding journeys that include IVR interactions (e.g., JES, patterns discovery, etc.).

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method for mapping a customer journey in an interactive voice response (IVR) system to a category from a categories list, the IVR system comprising a plurality of available menus, each menu having an associated menu prompt, and the customer journey reflecting a series of interactions with one or more of the plurality of menus, the method performed on a computer having a processor, a memory, and one or more code sets stored in the memory and executed by the processor, comprising:
    building, by the processor, a directed graph based on one or more sample IVR customer journeys;
        wherein the directed graph comprises one or more nodes and one or more directed arcs, each node of the directed graph representing a menu of the plurality of available menus, and each directed arc representing a menu path in an IVR sequence within a given sample IVR customer journey;
    generating, by the processor, a black list based on the directed graph;
    for a given customer journey:
        filtering, by the processor, one or more non-informative menus from the plurality of available menus based on the black list;
        concatenating, by the processor, the respective associated menu prompt of each menu that was not filtered, and one or more user responses to one or more menu prompts from the series of interactions in the given customer journey, into a concatenated word string;
        calculating, by the processor, a similarity score between the concatenated word string and a category name of each category from the categories list; and
        mapping, by the processor, the given customer journey to the category whose category name produces the highest similarity score.

2. The method as in claim 1, wherein a non-informative menu is identified for filtering based on at least one of a threshold degree of frequency of its representative node in the directed graph, a threshold in-degree of its representative node in the directed graph, and a threshold out-degree of its representative node in the directed graph.

3. The method as in claim 1, further comprising:
    adding, by the processor, text of IVR menu prompts to a predefined text corpus of combined text; and
    training one or more word embeddings based on the combined text.

4. The method as in claim 1, wherein generating the black list comprises extracting, by the processor, one or more menus from the set of IVR menus and adding the one or more menus to an IVR menus black list.

5. The method as in claim 4, wherein the filtering further comprises filtering, by the processor, the one or more non-informative menus by splitting the IVR sequence into one or more IVR menus;
    for each menu, if the menu is in the black list, removing the menu from the IVR journey; and
    outputting a filtered IVR journey.

6. The method as in claim 1, wherein the similarity score is calculated based on a cosine similarity.

7. The method as in claim 1, wherein a similarity map is generated for each comparison of a given IVR journey text to each category in the category list.

8. The method as in claim 7, wherein a highest similarity score is determined based on the similarity map reflecting the highest similarity.

9. The method as in claim 1, wherein the category is a contract reason and the list of categories is a list of contact reasons.

10. A system for mapping a customer journey in an interactive voice response (IVR) system to a category from a categories list, the IVR system comprising a plurality of available menus, each menu having an associated menu prompt, and the customer journey reflecting a series of interactions with one or more of the plurality of menus, comprising:
    a computer having a processor and memory; and
    one or more code sets stored in the memory and executed by the processor, which configure the processor to:
        build a directed graph based on one or more sample IVR customer journeys;
            wherein the directed graph comprises one or more nodes and one or more directed arcs, each node of the directed graph representing a menu of the plurality of available menus, and each directed arc representing a menu path in an IVR sequence within a given sample IVR customer journey;
        generate a black list based on the directed graph;
        for a given customer journey:
            filter one or more non-informative menus from the plurality of available menus based on the black list;
            concatenate the respective associated menu prompt of each menu that was not filtered, and one or more user responses to one or more menu prompts from the series of interactions in the given customer journey, into a concatenated word string;
            calculate a similarity score between the concatenated word string and a category name of each category from the categories list; and
            map the given customer journey to the category whose category name produces the highest similarity score.

11. The system as in claim 10, wherein a non-informative menu is identified for filtering based on at least one of a threshold degree of frequency of its representative node in the directed graph, a threshold in-degree of its representative node in the directed graph, and a threshold out-degree of its representative node in the directed graph.

12. The system as in claim 10, further configured to:
    add text of IVR menu prompts to a predefined text corpus of combined text; and
    train one or more word embeddings based on the combined text.

13. The system as in claim 10, wherein when the black list is generated, one or more menus are extracted from the set of IVR menus and the one or more menus are added to an IVR menus black list.

14. The system of claim 13, wherein, when filtering, the system is further configured to filter the one or more non-informative menus by splitting the IVR sequence into one or more IVR menus;
    for each menu, if the menu is in the black list, remove the menu from the IVR journey; and
    output a filtered IVR journey.

15. The system as in claim 10, wherein the similarity score is calculated based on a cosine similarity.

16. The system as in claim 10, wherein a similarity map is generated for each comparison of a given IVR journey text to each of category in the category list.

17. The system as in claim 16, wherein a highest similarity score is determined based on the similarity map reflecting the highest similarity.

18. The system as in claim 10, wherein the category is a contract reason and the list of categories is a list of contact reasons.

19. A method for mapping a customer journey in an interactive voice response (IVR) system to a category from a categories list, the IVR system comprising a plurality of available menus, each menu having an associated menu prompt, and the customer journey reflecting a series of interactions with one or more of the plurality of menus, the method performed on a computer having a processor, a memory, and one or more code sets stored in the memory and executed by the processor, comprising:
  building, by the processor, a directed graph based on one or more sample IVR customer journeys;
    wherein the directed graph comprises one or more nodes and one or more edges, each node of the directed graph representing a menu of the plurality of available menus, and each edge representing a menu path in a portion of a given sample IVR customer journey;
  generating, by the processor, a black list based on the directed graph;
  for a given customer journey:
    filtering, by the processor, one or more menus from the plurality of available menus based on the black list;
    concatenating, by the processor, the respective associated menu prompt of each menu that was not filtered, and one or more user responses to one or more menu prompts from the series of interactions in the given customer journey, into a concatenated word string;
    calculating, by the processor, a similarity score between the concatenated word string and a category name of each category from the categories list; and
    assigning, by the processor, the given customer journey to the category whose category name produces the highest similarity score.

20. The method as in claim 19, wherein a similarity map is generated for each comparison of a given IVR journey text to each of category in the category list; and
  wherein a highest similarity score is determined based on the similarity map reflecting the highest similarity.

* * * * *